(12) United States Patent
Takamatsu

(10) Patent No.: US 7,571,873 B2
(45) Date of Patent: Aug. 11, 2009

(54) WEBBING RETRACTOR

(75) Inventor: Hitoshi Takamatsu, Aichi (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 362 days.

(21) Appl. No.: 11/322,657

(22) Filed: Jan. 3, 2006

(65) Prior Publication Data

US 2006/0186250 A1    Aug. 24, 2006

(30) Foreign Application Priority Data

Jan. 6, 2005    (JP)    ............................ 2005-001723

(51) Int. Cl.
*B60R 22/353*  (2006.01)
*B60R 22/28*  (2006.01)
*B60R 22/405*  (2006.01)
*B60R 22/46*  (2006.01)

(52) U.S. Cl. .................. 242/382.2; 242/374; 242/379.1; 242/383.4; 242/384.6

(58) Field of Classification Search ............... 242/379.1, 242/382.1, 382.2, 382.4, 384, 384.5, 384.6; 280/805, 806, 807; 297/472, 476, 478
See application file for complete search history.

(56) References Cited

U.S. PATENT DOCUMENTS

| | | | | |
|---|---|---|---|---|
| 4,948,066 A | * | 8/1990 | Matsumoto et al. | 242/382.2 |
| 5,367,917 A | * | 11/1994 | Hishon et al. | 74/531 |
| 5,507,447 A | * | 4/1996 | Corrion et al. | 242/382.2 |
| 5,601,251 A | * | 2/1997 | Hishon et al. | 242/382.2 |
| 5,624,087 A | * | 4/1997 | Dick et al. | 242/381.1 |
| 5,653,398 A | | 8/1997 | Fohl | |
| 5,692,697 A | * | 12/1997 | Eaton et al. | 242/382.2 |
| 5,820,059 A | * | 10/1998 | Hibata et al. | 242/382.4 |
| 6,152,393 A | * | 11/2000 | Ando et al. | 242/382.2 |
| 6,460,935 B1 | | 10/2002 | Rees | |

(Continued)

FOREIGN PATENT DOCUMENTS

EP    0 811 535 A2    12/1997

(Continued)

OTHER PUBLICATIONS

Japanese Utility Model Application Laid-Open (JP-U) No. 3-121059.

(Continued)

*Primary Examiner*—Peter M Cuomo
*Assistant Examiner*—Scott Haugland
(74) *Attorney, Agent, or Firm*—Roberts Mlotkowski Safran & Cole, P.C.; Thomas W. Cole

(57) ABSTRACT

A webbing retractor is provided that enables elimination of the part of a webbing belt left in the spool in an entirely pulled-out state of a webbing belt.

A space portion is formed in a notched shape in an ALR switch lever. A cam projection of a cam plate that presses the ALR switch lever and changes it to the engaging direction side to a spool enters into the inside of the space portion and, thereby, the cam projection can rotate to an advanced position at the cam pull-out direction side with respect its contact position with the ALR switch lever, whereby the webbing belt can be pulled out entirely.

10 Claims, 6 Drawing Sheets

U.S. PATENT DOCUMENTS

| | | | |
|---|---|---|---|
| 6,641,078 B2 * | 11/2003 | Palliser | 242/382.2 |
| 2001/0038054 A1 * | 11/2001 | Mori et al. | 242/382.2 |
| 2002/0079397 A1 * | 6/2002 | Snyder | 242/382.2 |
| 2004/0195422 A1 * | 10/2004 | Fleischmann et al. | 242/382.2 |

FOREIGN PATENT DOCUMENTS

| | | |
|---|---|---|
| EP | 1243487 | 9/2002 |
| JP | 08-119064 | 5/1996 |

OTHER PUBLICATIONS

European Search Report, May 15, 2006.

European Search Report dated Jul. 13, 2006.

* cited by examiner

WEBBING RETRACTOR

CROSS-REFERENCE TO RELATED APPLICATION

This application claims priority under 35 USC 119 from Japanese Patent Application No. 2005-1723, the disclosure of which is incorporated by reference herein.

BACKGROUND OF THE INVENTION

1. Field of the Invention

The present invention relates to a seatbelt system for restraining bodies of vehicle occupants, and more specifically to a webbing retractor of a long strip-shaped webbing belt.

2. Description of the Related Art

In a long strip-shaped webbing belt structuring a seatbelt system for a vehicle, a longitudinal base end thereof is engaged to a spool of a webbing retractor. When the spool is rotated in a take-up direction that is one direction around its own axis, the webbing belt is taken up and stored by the spool.

In this kind of a webbing retractor, a lock mechanism that regulates the rotation of the spool in a pull-out direction that is opposite to the take-up direction and thereby limits the pull-out action of the webbing belt.

As an aspect of such a lock mechanism, there is known an emergency locking retractor mechanism (hereinafter referred to as "ELR mechanism") that detects a rapid deceleration condition of a vehicle and regulates the rotation of the spool in the pull-out direction. Further, there is also known an automatic locking retractor (hereinafter referred to as "ALR mechanism") that is different from the ELR mechanism and regulates the rotation of the spool in the pull-out direction irrespective of the vehicle's conditions when the webbing belt is attached.

An example of a webbing retractor having both the ELR mechanism and the ALR mechanism is disclosed in Japanese Utility Model Application Laid-Open (JP-U) No. 03-121059.

The webbing retractor disclosed in JP-U No. 03-121059 has a lock ring. The lock ring is arranged coaxially and relatively rotatably to the spool and rotates in compliance with the spool that rotates by urging force of an urging member. However, when the lock ring cannot follow the spool rotating in the pull-out direction, there occurs a relative rotation between the spool and the lock ring, and a lock means works to regulate the rotation of the spool in the pull-out direction.

The ALR lever of the webbing retractor disclosed in the above document is arranged so as to reciprocate between its engaging position and its retreat position retreated from the engaging position. The ALR lever moves to the engaging position to engage with the lock ring thereby regulates the rotation of the lock ring in the pull-out direction.

The ALR lever is reciprocated by a release gear between the engaging position and the retreat position. The release gear is a deceleration gear coupled to the rotation of the spool, and makes its one rotation around the spool by coupling with the spool rotations between an entirely stored condition where the webbing belt is taken up and stored and an entirely pulled-out condition where the webbing belt is entirely pulled out.

In the release gear, a cam and the like are formed. When the spool rotates in the pull-out direction until just before the entirely pulled-out condition, the cam and the like engage with the ALR lever, and when the spool rotates in the pull-out direction further in this condition, the cam and the like in combination with this rotation press the ALR lever to move it to the engaging position.

Further, when the spool rotates in the take-up direction until just before the entirely stored condition, the above cam and the like or a different release cum and the like formed on the release gear engage with the ALR lever, and when the spool rotates in the take-up direction further in this condition, the release cam and the like press the ALR lever to move it to the retreat position.

In the above-described webbing retractor, the engaging relation between the release gear and the ALR lever is so set that the ALR lever moves to the engaging position when the webbing belt is in its condition just before the entirely pulled-out condition.

There is another structure where the ALR lever moves to the engaging position when the spool rotates in the take-up direction at a specified angle after the webbing belt gets in its entirely pulled-out condition.

The seatbelt system is assembled into a vehicle in a condition where the webbing belt is entirely pulled out from the spool, and after the assembly, the webbing belt is taken up by the spool.

When the webbing retractor is assembled into a vehicle, the webbing belt is entirely pulled out by locating the cam and the like of the release gear at a temporary position where the webbing belt can be entirely pulled out, then the assembly is carried out.

Meanwhile, after the assembly, the cam and the like of the release gear contact the ALR lever in the condition where the webbing belt is just before entirely pulled-out and the cum and the like do not further move in the pull-out direction of the webbing belt. Namely, in the webbing retractor of such a structure, after assembly, the webbing belt cannot be entirely pulled out from the spool.

Accordingly, in such a webbing retractor, in a condition where occupants and the like of a vehicle recognize that the webbing belt is entirely pulled out (hereinafter referred to as "a surface entirely pulled-out condition"), there is actually a part of the webbing belt left in the spool, therefore, it is necessary to set the full length of the webbing belt longer in its manufacture.

SUMMARY OF THE INVENTION

The object of the present invention is to provide a webbing retractor that enables to eliminate the part of the webbing belt left in the spool in the surface entirely pulled-out condition of the webbing belt.

A webbing retractor according to a first aspect of the invention includes a spool to which a base end of a long strip-shaped webbing belt is engaged, that takes up and stores the webbing belt, rotates when the webbing belt is pulled out to feed the webbing belt out; a pressing member that moves in conjunction with the rotation of the spool; and an engaging member that can move in an engaging direction to directly or indirectly engage with the spool and also in the opposite direction thereto. The engaging member is pressed by the pressing member moving in conjunction with the spool, and moves in the engaging direction when the spool rotates until just before the webbing belt is entirely pulled out. At the engaging member, a space portion is formed so as to open toward the pressing member side in the moving state of the engaging member in the engaging direction. When the spool rotates until the webbing belt is entirely pulled out, the pressing member moving in conjunction with the spool enters inside of the space portion of the engaging member.

According to the above aspect, when the spool rotates, the pressing member moves in conjunction with this rotation of the spool. When the spool rotates until just before the webbing belt is entirely pulled out from the spool, the pressing member presses the engaging member. The engaging member pressed by the pressing member moves in the engaging direction.

When the engaging member moves in the engaging direction or when the engaging member moves further in the engaging direction, the engaging member engages directly or indirectly with the spool.

At the engaging member, the space portion is formed. In the state just before the webbing belt is entirely pulled out, the engaging member pressed by the pressing member moves and the space portion of the engaging member faces the pressing member. In this state, the space portion opens toward the pressing member side, and the pressing member can enter inside of the space portion. When the spool rotates until the webbing belt is entirely pulled out, in conjunction with this spool rotation, the pressing member enters inside of the space portion.

Since the space portion is arranged at the engaging member, when the spool rotates further in the direction to pull out the webbing belt after the pressing member reaches the position to press the engaging member, the pressing member can enter inside of the space portion and move in conjunction with the rotation of the spool.

Thereby, the rotation of the spool until the webbing belt is entirely pulled out is not prevented by the engaging member. Accordingly, there is no part of the webbing belt left in the spool and the entire webbing belt can be pulled out.

A webbing retractor according to a second aspect of the invention includes a spool to which a base end of a long strip-shaped webbing belt is engaged, and that takes up and stores the webbing belt, rotates when the webbing belt is pulled out to feed the webbing belt out; a pressing member that moves coaxially with the spool in conjunction with the rotation of the spool, and at which a projection is formed to project in parallel with a rotation axis of the spool at an outer side in a rotation radial direction relative to a rotational center of the spool; and an engaging member that can move in a direction toward a rotational center of the pressing member to directly or indirectly engage with the spool. The engaging member is pressed by the projection moving in conjunction with the spool and moves in the direction toward the rotational center of the pressing member when the spool rotates until just before the webbing belt is entirely pulled out. At the engaging member, a space portion is formed so as to open toward the projection side in the moving state of the engaging member toward the rotational center of the pressing member. When the spool rotates until the webbing belt is entirely pulled out, the projection moving in conjunction with this spool movement enters inside of the space portion of the engaging member.

According to the above aspect, in conjunction with the rotation of the spool, the pressing member moves coaxially with the spool. When the spool rotates until just before the webbing belt is entirely pulled out from the spool, the projection of the pressing member that rotates in conjunction with this rotation of the spool presses the engaging member. The engaging member moves in the direction toward the rotational center of the pressing member.

When the engaging member moves in the engaging direction by the pressing force from the pressing member, or, when the engaging member moves further in the direction toward the rotational center of the pressing member, the engaging member engages directly or indirectly with the spool.

In the engaging member, the space portion is formed. In the state just before the webbing belt is entirely pulled out, the engaging member pressed by the projection of the pressing member moves and the space portion of the engaging member faces the projection. When the spool rotates until the webbing belt is entirely pulled out, in conjunction with this rotation of the spool, the projection of the pressing member enters inside of the space portion.

Since the space portion is arranged at the engaging member, when the spool rotates further in the direction to pull out the webbing belt after the projection of the pressing member reaches the position to press the engaging member, the projection can enter inside of the space portion, and the projection (and accordingly, the pressing member) can rotate in conjunction with the rotation of the spool.

Thereby, the rotation of the spool until the webbing belt is entirely pulled out is not prevented by the engaging member. Accordingly, there is no part of the webbing belt left in the spool and the entire webbing belt can be pulled out.

In a webbing retractor according to a third aspect of the invention, a long strip-shaped webbing belt is taken up and stored by a spool to which a base end of the webbing belt is engaged, and when the webbing belt is pulled, the spool rotates in one direction around its own axis and the webbing belt is pulled out, and when the webbing retractor is assembled into a vehicle, the webbing belt is in an initial state where the entire webbing belt is pulled out. A webbing retractor further comprises a pressing member that moves coaxially with the spool in conjunction with the rotation of the spool, and at which a projection is formed to project in parallel with a rotation axis of the spool at an outer side in a rotation radial direction relative to a rotational center of the spool; and an engaging member that can move in a direction toward and away from a rotational center of the pressing member and directly or indirectly engages with the spool when moving toward the rotational center of the pressing member. The engaging member has a main body and a projecting portion, and the projecting portion is formed to extend toward a rotation trajectory of the projection of the pressing member. When the projecting portion is pressed by the projection just before the webbing belt is entirely pulled out, the main body moves toward the rotational center of the pressing member. At the engaging member, a space portion is formed so as to open toward the projection side in the moving state of the engaging member toward the rotational center of the pressing member. When the spool rotates until the webbing belt is entirely pulled out, the projection moving in conjunction with the spool enters inside of the space portion. In the initial state, the projection is arranged at the same position as that of the projection in the state where the webbing belt is entirely pulled out.

According to the above aspect, an entirely pulled-out state where the webbing belt is entirely pulled out is made as an initial state and the webbing retractor is assembled into a vehicle in this initial state.

After the assembly, in conjunction with the rotation of the spool, the pressing member moves coaxially with the spool. When the spool rotates until just before the webbing belt is entirely pulled out from the spool, the projection of the pressing member that rotates in conjunction with this rotation of the spool presses the projecting portion formed at the main body of the engaging member. The engaging member whose projecting portion is pressed by the projection moves in the direction toward the rotational center of the pressing member.

When the engaging member moves by the pressing force from the pressing member, or when the engaging member moves further in the direction toward the rotational center of the pressing member from this state, the main body of the engaging member engages directly or indirectly with the spool.

In the initial condition at the assembly, the projection of the pressing member is positioned at the advanced position in a pull-out direction of the webbing belt in conjunction with the rotation of the spool in the pull-out direction than a location of the projecting portion of the engaging member. Accordingly, in order to make the spool rotate until the webbing belt is entirely pulled out after the assembly, the projection must rotate further from the contact position with the projecting portion.

When the projecting portion is pressed by the projection and the main body of the engaging member moves, the space portion formed in the main body of the engaging member faces the projection. In this state, the space portion opens toward the projection, and the projection can enter inside thereof.

The spool rotates further in the pull-out direction from this state where the projection presses the projecting portion and moves the main body of the engaging member, the projection of the pressing member in conjunction with this spool rotation enters inside of the space portion. Thereby, the projection can rotates to the same position as the advanced position in the initial state at the assembly.

Namely, even when the spool is rotated in the pull-out direction in order to pull out the webbing belt entirely same as at the assembly, the projecting portion and the main body of the engaging member do not prevent the projection from rotating, and accordingly, the spool from rotating in the pull-out direction.

Thereby, in the webbing retractor according to the present invention, it is possible to pull out the webbing belt entirely in the same manner as in the initial state at the assembly without causing part of the webbing belt left in the spool.

In each of the above aspects, further, a rotating body and a locking member may be arranged. The locking member is arranged so as to be able to engage directly or indirectly with the spool and regulates the rotation of the spool in a pull-out direction in an engaged state with the spool. The rotating body may include the engaging member, a rotating engaging member, and a connecting member. The rotating engaging member rotates together with the rotating body in the pull-out direction of the webbing belt and makes the locking member engage directly or indirectly with the spool in accordance with the rotation. The connecting member connects the rotating body directly or indirectly to the spool and makes the rotating body rotate in the pull-out direction together with the spool in respective states where the spool rotates rapidly in the pull-out direction and where a vehicle is rapidly decelerated. The rotating body may be arranged so as to be coaxial and rotatable relative to the spool, or may be structured so as to rotate together with the spool in the pull-out direction in a state where the engaging member engages directly or indirectly with the spool.

According to the above aspect, when the webbing belt is attached to a vehicle occupant, for example, the webbing belt is in the condition between entirely pulled-out and entirely stored to the spool and the engaging member engages with the spool. When the spool rotates in the direction to which the webbing belt is pulled out, the rotating body on which the engaging member is arranged rotates together with the spool in the pull-out direction of the webbing belt.

The rotation engaging member arranged in the rotating body rotates together with the rotating body in the pull-out direction. The locking member is engaged directly or indirectly with the spool by the rotation engaging member and the rotation of the spool in the pull-out direction is regulated by the locking member.

On the other hand, for example, when the spool rotates in the pull-out direction rapidly as the webbing belt set to a occupant's body is pulled out rapidly, or when a vehicle gets in it rapid deceleration state, the connecting member arranged in the rotating body connects the rotating body directly or indirectly with the spool.

When the rotating body is connected directly or indirectly with the spool in this manner, the rotating body, and accordingly the rotation engaging member rotate together with the spool in the pull-out direction, thereby, the rotation engaging member engages the locking member directly or indirectly with the spool. Accordingly, even in such states, the spool rotation in the pull-out direction is regulated by the locking member.

In the above aspect, at least a part of the members of a structure to regulate the rotation of the spool in the pull-out direction in the case of rapid deceleration of a vehicle, at least a part of the members of a structure to regulate the rotation of the spool in the pull-out direction when the spool rotates rapidly in the pull-out direction, and, a structure for connecting the rotating body to the spool in the condition where the webbing belt is substantially entirely pulled out from the spool are arranged in the single rotating body. Thereby, it is possible to simplify the entire structure of the retractor, and make the entire retractor compact.

A webbing retractor according to a fourth aspect of the present invention comprises a spool to which a base end of a long strip-shaped webbing belt is engaged that takes up the webbing belt; a pressing member that moves in conjunction with the rotation of the spool and presses an engaging member; and the engaging member which can move in an engaging direction to directly or indirectly engage with the spool and also in the opposite direction to the engaging direction. A space portion to house the pressing member is formed at the engaging member. In a state where the webbing belt is entirely pulled out from the spool, the pressing member is housed in the space portion.

According to the above respective aspects, it is possible to eliminate the part of the webbing belt left in the spool in the entirely pulled-out state of the webbing belt.

DETAILED DESCRIPTION OF THE INVENTION

First, the overall structure of a webbing retractor 10 relating to an embodiment of the present invention will be described.

Figure 6:
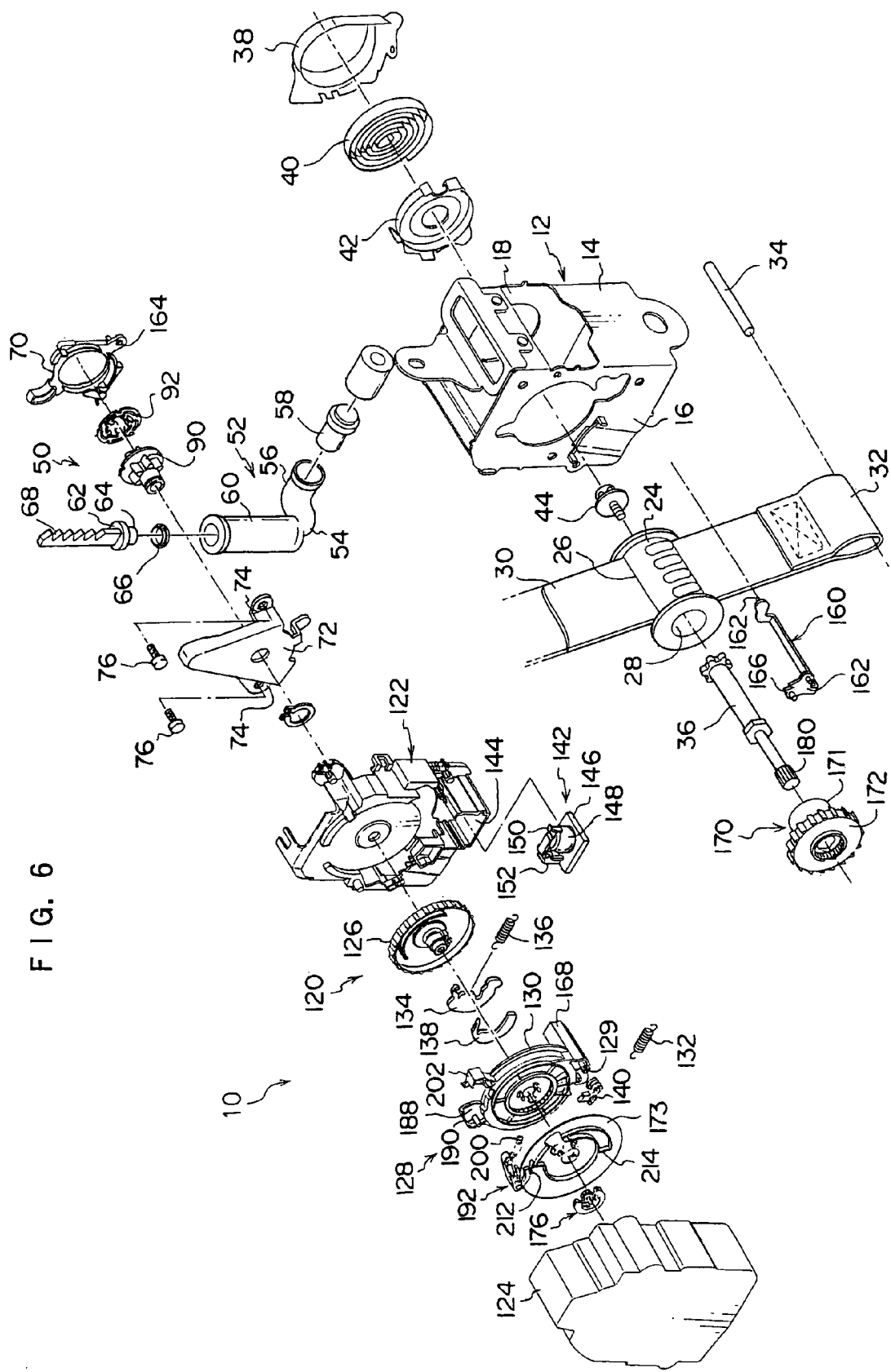
FIG. 6 is an enlarged and exploded perspective view showing the outline of an entire structure of a webbing retractor according to an embodiment of the present invention.

The overall structure of the webbing retractor 10 is summarily shown in an exploded perspective view in FIG. 6.

The webbing retractor 10 has a frame 12. The frame 12 has a plate-shaped back plate 14 whose direction of thickness runs substantially along the left-right direction of the vehicle. The webbing retractor 10 is mounted to a vehicle body due to the back plate 14 being fixed to a vicinity of the lower end portion of the center pillar of the vehicle body by a fastening means such as bolts or the like for example.

A leg plate 16 is formed by being bent inwardly in the transverse direction of the vehicle (the substantially left-right direction of the vehicle) from one transverse direction end of the back plate 14 provided along the substantially longitudinal direction of the vehicle. A leg plate 18 is formed by being bent in the same direction as the leg plate 16 from the other transverse direction end of the back plate 14.

A spool 24 is provided between the leg plate 16 and the leg plate 18. The spool 24 is formed substantially in the shape of a cylindrical tube whose axial direction runs along a direction in which the leg plate 16 and the leg plate 18 oppose one another. An insert-through hole 26 is formed in the spool 24.

Both ends of the insert-through hole 26 open at outer peripheral portions of the spool 24, and the configurations of these openings are shaped as slits which are long along an axial direction of the spool 24. The insert-through hole 26 is formed so as to avoid a pass-through hole 28 which passes through the axially central portion of the spool 24. A longitudinal direction base end side (proximal end side) of an elongated, strip-shaped webbing belt 30 is inserted through from one opening end of the insert-through hole 26.

A tubular portion 32, which passes-through in a transverse direction of the webbing belt 30, is formed at the longitudinal direction base end portion of the webbing belt 30. By disposing a stopper shaft 34 at an inner side of the tubular portion 32 which has passed through the insert-through hole 26, the base end side of the webbing belt 30 is prevented from being through out the insert-through hole 26 at the time when the webbing belt 30 is pulled toward the opposite end side to its base end side (distal end side) in the pull-out operation.

Due to the spool 24 rotating in a take-up direction which is one direction around its own axis, the webbing belt 30 is taken-up in layers from the base end side thereof onto the outer peripheral portion of the spool 24 and accommodated.

On the other hand, a rod-shaped torsion shaft 36, whose longitudinal direction runs along the axial direction of the spool 24, is disposed at the inner side of the pass-through hole 28. The torsion shaft 36 is connected to the spool 24 in a state of being prevented from rotating in directions around the axis at the leg plate 18 side of the inner side of the spool 24. Further, the end portion of the torsion shaft 36 at the leg plate 18 side passes through the leg plate 18 and projects outwardly of the frame 12.

A spring cover 38 is disposed at an outer side of the leg plate 18. The spring cover 38 is shaped as a box which is open toward the leg plate 18. The spring cover 38 is fixed to the leg plate 18 by fastening means such as screws or the like, or by the fitting-together of fit-together claws or the like which are formed at the spring cover 38 or the leg plate 18.

A spiral spring 40 is housed at an inner side of the spring cover 38. The spiral spring 40 has a structure such that the urging force thereof gradually increases due to a spiral direction inner side end thereof being rotated in a pull-out direction of the webbing belt which is opposite to the aforementioned take-up direction, with respect to a spiral direction outer side end thereof. The spiral direction outer side end of the spiral spring 40 is anchored on a spring seat 42 which is provided nearer to the opening side of the spring cover 38 than the spiral spring 40.

The spring seat 42 is fixed to the spring cover 38. The spiral direction outer side end of the spiral spring 40 is connected to the leg plate 18 (the frame 12) via the spring seat 42 and the spring cover 38. Further, an adapter 44 is provided in a vicinity of the spiral direction inner side end of the spiral spring 40.

The spiral direction inner side end of the spiral spring 40 is fixed to a portion of an outer periphery of the adapter 44. Further, the leg plate 18 side end portion of the torsion shaft 36 which passes through the spring seat 42, is fixed to an axially central portion of the adapter 44.

On the other hand, a pretensioner 50 is provided at an outer side of the leg plate 16. The pretensioner 50 has a cylinder 52.

In the present embodiment, the cylinder 52 is formed by being bent appropriately at a bent portion 54, which is set at an axial direction intermediate portion of a metal pipe for example, while being plastically deformed such that the cross-sectional configuration thereof deforms appropriately while the communication at the interior thereof is maintained. One end of the cylinder 52 at one axial direction side of the bent portion 54 is a mounting portion 56. A gas generator 58 is mounted to an opening end of the mounting portion 56.

The gas generator 58 is connected electrically or mechanically to an acceleration sensor (not shown). When the acceleration sensor detects acceleration (deceleration) in a case in which the vehicle enters a state of rapid deceleration, a gas generating agent provided within the gas generator 58 is ignited. The gas generating agent thereby combusts in an extremely short period of time, and generates gas instantaneously.

A portion of the cylinder 52 at the opposite side of the bent portion 54 where the mounting portion 56 is located, is a cylinder main body 60. As mentioned above, the communication at the interior of the bent portion 54 is ensured, the gas which is generated by the gas generator 58 mounted to the mounting portion 56, is supplied to the floor portion side of the cylinder main body 60. Further, a piston 62 is provided within the cylinder main body 60.

The piston 62 is formed in the shape of a disk whose outer diameter is substantially equal to (strictly speaking, slightly smaller than) the inner diameter of the cylinder main body 60. A holding portion 64, which is shaped as a solid cylinder, is formed coaxially and integrally with the piston 62, at an end surface of the piston 62 which is directed toward a floor portion of the cylinder main body 60. The outer diameter of the holding portion 64 is smaller than the diameter of the piston 62, and a sealing member 66 is fit on an outer peripheral portion of the holding portion 64.

The sealing member 66 is formed in an annular shape and is elastic. In the state in which the piston 62 is disposed at the inner side of the cylinder main body 60, the sealing member 66 elastically press-contacts both the outer peripheral portion of the holding portion 64 and the inner peripheral portion of the cylinder main body 60, and seals the region between the holding portion 64 and the cylinder main body 60. Therefore, when the gas is supplied into the cylinder main body 60 and the internal pressure of the cylinder main body 60 rises, the piston 62 slides toward the upper end side of the cylinder main body 60.

A rack bar 68 which serves as a sliding member is formed at a side of the piston 62 opposite to the side where the holding portion 64 is located (i.e., at the side of the opening end of the cylinder main body 60). The rack bar 68 is shaped as a rectangular rod which is long along the direction of opening of the cylinder main body 60. A plurality of rack teeth are formed at one transverse direction end of the rack bar 68 at uniform intervals along the longitudinal direction thereof.

A gear case 70 serving as a supporting member is provided at the leg plate 16 side in a vicinity of the opening end of the cylinder main body 60. A cover plate 72 is provided at a side of the cylinder main body 60 which is opposite to a side at which the gear case 70 is located.

The cover plate 72 is formed in the shape of a box which can cover the rack bar 68 projected out from the cylinder main body 60 at the side of the cylinder main body 60 opposite to the side where the leg plate 16 is located. The cover plate 72 is formed in a configuration so as not to interfere with at least the rack bar 68 which projects out from the opening end of the cylinder main body 60. Further, a plurality of fastened pieces 74 are formed at an outer peripheral portion of the cover plate 72. The cover plate 72 is fixed to the frame 12 by these fastened pieces 74 being fastened and fixed to the leg plate 16 by screws 76.

A holding portion (not illustrated), put into which are the opening end of the cylinder main body 60 and the vicinity thereof, is formed at the cover plate 72. The cover plate 72 is connected to the cylinder main body 60. A pinion 90 is disposed between the cover plate 72 and the gear case 70.

The pinion 90 meshes together with the rack teeth at the distal end side of the rack bar 68, and is rotatably supported at the other end of the torsion shaft 36 which passes through the leg plate 16 and the gear case 70. The pinion 90 rotates in the take-up direction due to the rack bar 68 rising.

A clutch 92 is provided at the leg plate 16 side of the pinion 90. Because the clutch 92 is rotatably supported at the torsion shaft 36, even if the torsion shaft 36 rotates, the clutch 92 does not rotate. However, the clutch 92 is engaged with the pinion 90 and when the pinion 90 rotates in the take-up direction, due to the torque thereof, a portion of the clutch 92 deforms and is connected to the torsion shaft 36.

A lock mechanism 120 is provided at the side of the leg plate 16. The lock mechanism 120 has a sensor holder 122. The sensor holder 122 is formed in concave shape and partly opens toward the leg plate 16 side. A portion of the cover plate 72 is positioned within the sensor holder 122.

Cylindrical-tube-shaped projections are formed to project from predetermined regions of the outer peripheral portion of the sensor holder 122 toward the leg plate 16. The cylindrical-tube-shaped projections are inserted and fit-into holes formed in the leg plate 16 and "plug pins" are press-fit into the projections. The sensor holder 122 is, thereby, fixed to the leg plate 16.

A sensor cover 124 is provided at a side of the sensor holder 122 opposite to a side at which the leg plate 16 is located. Fit-together claws or the like are formed at an outer peripheral portion or the like of the sensor cover 124, and the sensor cover 124 is mechanically connected to the sensor holder 122 by the fit-together claws fitting together with predetermined regions of the sensor holder 122. A tubular shaft receiving portion (not shown) is formed at the sensor cover 124. The other end portion of the torsion shaft 36, which passes through the sensor holder 122, is rotatably supported thereat.

A V gear 126 is provided between the sensor holder 122 and the sensor cover 124. The V gear 126 is a ratchet wheel in which ratchet teeth are formed at an outer peripheral portion thereof, and is fixed coaxially and integrally to the torsion shaft 36. A sensor gear 128 serving as "a rotating body" is provided at a sensor cover 124 side of the V gear 126.

The torsion shaft 36 passed coaxially through a main body 130 of the sensor gear 128. The main body 130 of the sensor gear 128 is rotatably supported at the torsion shaft 36. One end of a return spring 132 is anchored on a portion of the sensor gear 128. The return spring 132 is a helical tension spring and the other end thereof is anchored at the sensor cover 124. When the sensor gear 128 rotates around the torsion shaft 36 in the pull-out direction, the return spring 132 urges the sensor gear 128 in the take-up direction.

A W pawl 134 is provided at a sensor gear 128 side of the V gear 126. The W pawl 134 is supported at the V gear 126 so as to be rotatable around an axis parallel to the spool 24 at a position which is eccentric with respect to the axial center of the spool 24.

Due to the W pawl 134 rotating in the take-up direction with respect to the V gear 126, the W pawl 134 is displaced at an outer side of a rotation radial of the V gear 126 with respect to the V gear 126. Due to this displacement, the W pawl 134 engages with an engaging portion (not shown) formed at the main body 130 of the sensor gear 128. In the state in which the W pawl 134 is engaged with the engaging portion of the main body 130, the torque of the V gear 126 in the pull-out direction can be transmitted to the sensor gear 128 via the W pawl 134, and the sensor gear 128 can be rotated in the pull-out direction together with the V gear 126.

A sensor spring 136 is provided at a side of the W pawl 134. The sensor spring 136 is a compression coil spring and one end thereof is fixed to the W pawl 134. The other end of the sensor spring 136 is fixed to the V gear 126. The sensor spring 136 urges the W pawl 134 in the take-up direction around the torsion shaft 36 with respect to the V gear 126.

A W mass 138 is provided at a side of the W pawl 134 opposite to a side at which the V gear 126 is located. The W mass 138 is a plate member whose direction of thickness runs along the axial direction of the torsion shaft 36, and is mounted as a weight (deadweight) of the W pawl 134.

Figure 1:
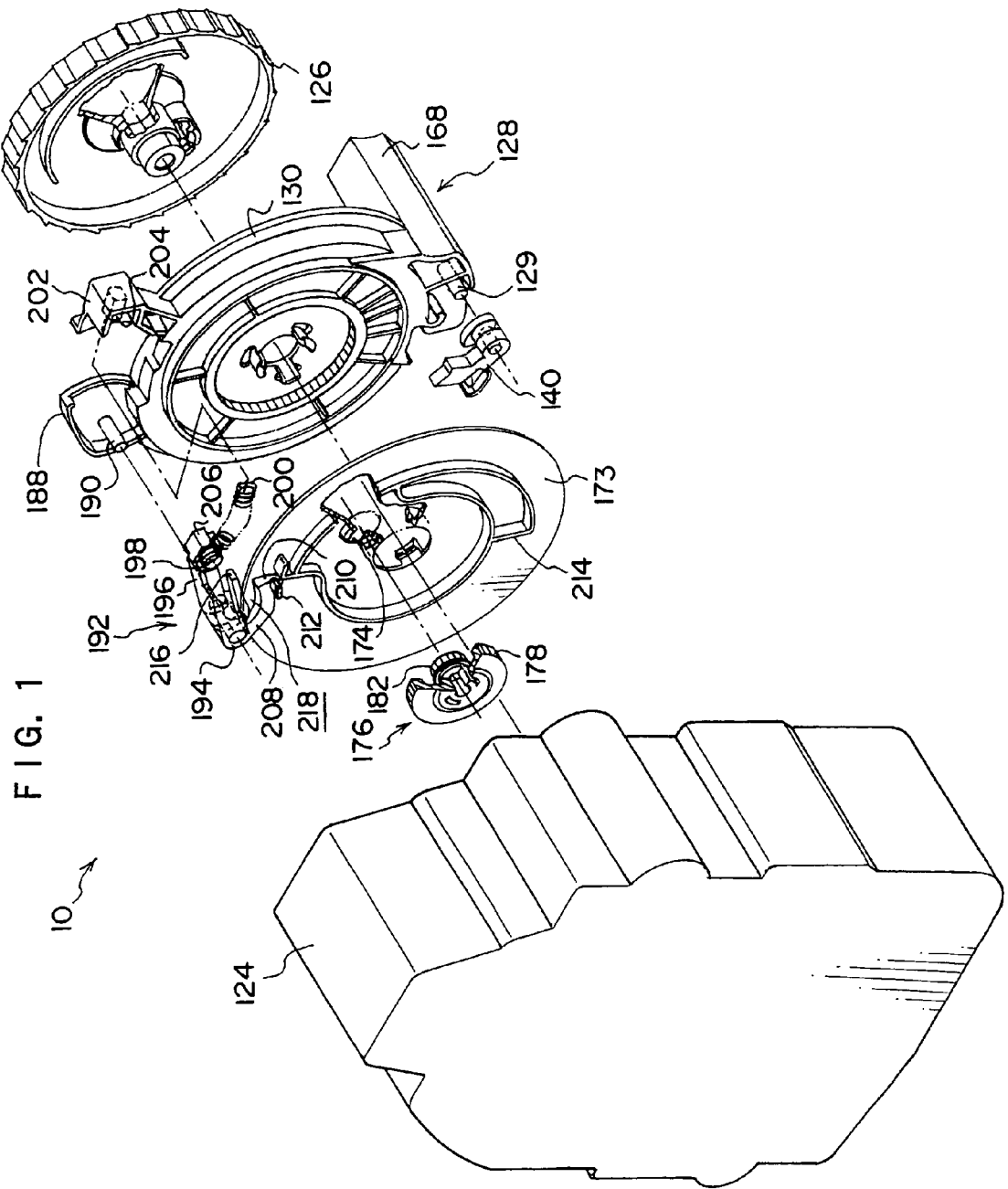
FIG. 1 is an enlarged and exploded perspective view showing the structure of a substantial portion of a webbing retractor according to an embodiment of the present invention.

As shown in FIG. 1 in addition to FIG. 6, a pressing portion 168 which is a longitudinal "rotating engaging member" is formed at the main body 130 of the sensor gear 128. The pressing portion 168 is formed at a V gear 126 side of the sensor gear 128 as being extended toward the V gear 26. A shaft 129 is formed as projecting at an end of the pressing portion 168 opposite to thee V gear 126 side. An engaging claw 140 serving as a "connecting member" is supported by the main body 130 via the shaft 129, and is rotatable around an axis parallel to the axial direction of the torsion shaft 36.

As shown in FIG. 6. an acceleration sensor 142 is provided beneath the engaging claw 140. A box-shaped housing portion 144, which opens toward the sensor cover 124, is formed at the sensor holder 122. At least a portion of the acceleration sensor 142 is housed in the housing portion 144.

The acceleration sensor 142 has a base 146. The base 146 is formed in the shape of a flat plate whose direction of thickness is the vertical direction. A curved surface, which opens upwardly, is formed at the upper side end surface of the base 146. A hard ball 148 serving as an inertial body is placed on this curved surface. A sensor claw 150 is provided above the hard ball 148.

The sensor claw 150 is rotatably supported at the upper end of a vertical wall 152 which stands erect upwardly from a portion of the outer periphery of the base 146. Due to the hard ball 148 rolling on the curved surface of the base 146 and rising, the sensor claw 150 is pushed upward. After pushed upward by the hard ball 148, the sensor claw 150 engages with the engaging claw 140 and rotates the engaging claw 140.

The V gear 126 is positioned at a side in the direction of rotation of the engaging claw 140 which is rotated due to the engagement of the sensor claw 150. In this way, the engaging claw 140 meshes together with the V gear 126. Due to the engaging claw 140 meshing together with the V gear 126, the torque of the V gear 126 in the pull-out direction is transmitted to the engaging claw 140 and accordingly to the sensor gear 128, and the sensor gear 128 rotates in the pull-out direction against the urging force of the return spring 132.

On the other hand, the lock mechanism 120 has a lock pawl 160 which serves as a "locking means". The lock pawl 160 has a shaft 162. The axial direction of the shaft 162 is parallel to (the same direction as) the axial direction of the spool 24. One end of the shaft 162 is rotatably supported in a shaft receiving hole (not shown) formed in the leg plate 18.

The other end of the shaft 162 is rotatably supported at the shaft bearing hole 164 formed at the gear case 70. A pawl portion 166 is formed at the other end side of the shaft 162. The pawl portion 166 is a plate-shaped member whose direction of thickness runs along the axial direction of the shaft 162. External ratchet teeth are formed at a portion of the outer periphery of the pawl portion 166.

A lock base 170 is provided at a side of the pawl portion 166 along the rotation radial direction of the shaft 162. The lock base 170 has a fit-in portion 171. The fit-in portion 171 is formed in a shape of a cylinder and is fit and inserted in one end portion of the pass-through hole 28 of the spool 24 rotatably and coaxially with respect to the spool 24.

The torsion shaft 36 coaxially passes through the fit-in portion 171, and accordingly the lock base 170, in a state in which rotation is prevented. The fit-in portion 171 and the lock base 170 rotate integrally and coaxially with respect to the torsion shaft 36.

A ratchet portion 172 is formed integrally with a leg plate 16 side of the fit-in portion 171. The ratchet portion 172 is formed coaxially with respect to the fit-in portion 171. Ratchet teeth are formed intermittently at an outer peripheral portion of the ratchet portion 172.

Due to the shaft 162 rotating in the take-up direction, the ratchet teeth of the pawl portion 166 mesh together with the ratchet teeth of the ratchet portion 174. In this state in which the pawl portion 166 and the ratchet portion 172 are meshed together, rotation of the ratchet portion 172, and accordingly the lock base 170, in the pull-out direction is restricted.

Further, the pressing portion 168 is situated as corresponding to the pawl portion 166, and when the main body 130 rotates in the pull-out direction, the pressing portion 168 presses the pawl portion 166 and rotates the lock pawl 160 in the take-up direction.

As shown in FIG. 6, and FIG. 1 in more details, on an opposite side to the V gear 126 side of the censer gear 128, a cam plate 173 as a pressing member is arranged. The cam plate 173 is formed into a rough disk shape and is rotatably supported by the torsion shaft 36.

A circular hole 174 is formed on a position displaced to an outside in the radial direction from the center of the cam plate 173, and a deceleration gear 176 is rotatably supported around an axis in parallel with the spool 24. The deceleration gear 176 has a gear portion 178. The gear portion 178 is an outside tooth spur gear and is positioned at an opposite side to the sensor gear 128 with respect to the cam plate 173. In correspondence to the gear portion 178, a gear 180 is arranged at an end side of the torsion shaft 36. The gear 180 has a smaller number of teeth than those of the gear portion 178, and is arranged coaxially and integrally with the torsion shaft 36 and engages with the gear portion 178.

The deceleration gear 176 has a gear portion 182. The gear portion 182 is formed coaxially and integrally with the gear portion 178, and has a smaller number of teeth than those of the gear portion 178. Further, the gear portion 182 is positioned at the sensor gear 128 side of the cam plate 173.

Figure 2:
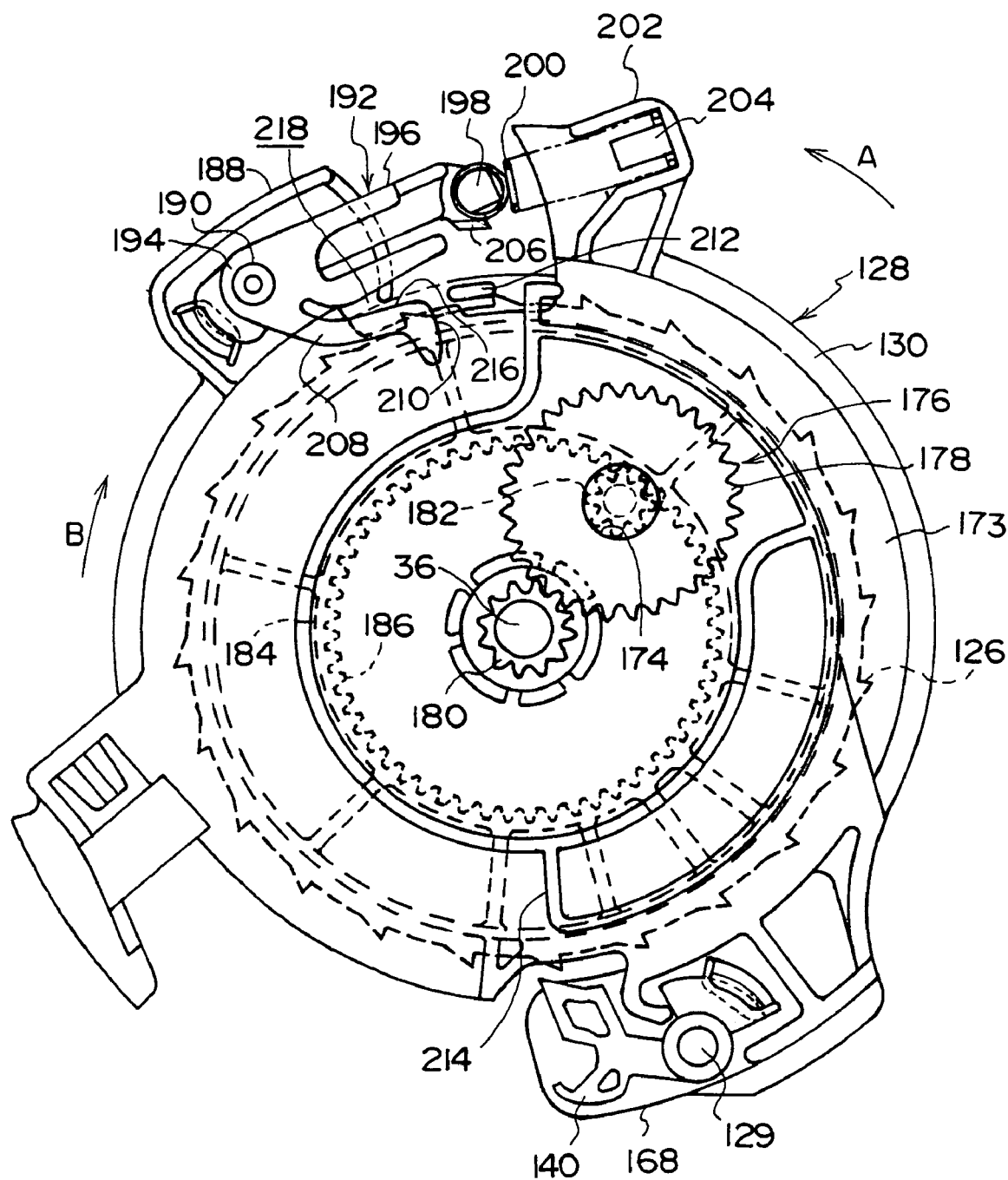
FIG. 2 is a front view showing the structure of a substantial portion of a webbing retractor according to an embodiment of the present invention, and is a figure showing a condition where a pressing member goes close to an engaging member.

As shown in FIG. 2, on the surface of the sensor gear 128 side of the cam plate 173, a ring-shaped rib 184 coaxial to the spool 24 is formed. In the inner circumferential portion of the rib 184, an inside tooth gear 186 having sufficiently larger number of teeth than the gear portion 182 is formed. The gear portion 182 engages to the inside tooth gear 186

When the spool 24, and accordingly the torsion shaft 36 rotate around their own axes, this rotation force is decelerated by transmitted through the gear 180 of the torsion shaft 36, the gear portion 178 and the gear portion 182 of the deceleration gear 176, and the gear 186 of the rib 184. The decelerated rotation force is transmitted to the cam plate 173, thereby, the cam plate 173 rotates around the torsion shaft 36. Meanwhile, hereinafter, the rotation direction of the cam plate 173 rotating in connection with the torsion shaft 36 in the pull-out direction is referred to as "cam pull-out direction" (a direction of an arrow A indicated in FIG. 2), and on the contrary, the rotation direction of the cam plate 173 in the take-up direction is referred to as "cam take-up direction" (a direction of an arrow B indicated in FIG. 2).

Further, as shown in FIG. 1, on the main body 130 of the sensor gear 128, a lever housing portion 188 is formed at a substantially opposite side of the pressing portion 168. At the lever housing portion 188, a shaft 190 coaxial with the spool 24 is formed to project toward an opposite side to the V gear 126 side of the sensor gear 128.

As shown in FIG. 2, an ALR switch lever 192 as an "engaging member" is attached to the shaft 190. The ALR switch lever 192 has a base 194. The shaft 190 passes through the base 194 so that the base 194 and accordingly the ALR switch lever 192 are supported by the shaft 190 so as to be rotatable around the shaft 190.

From the base 194, an extending piece 196 is extended toward the outside of the radius of rotation thereof. At the end portion of the extending piece 196, an engaging projection 198 is formed. One end of a coil spring 200 is engaged to the engaging projection 198. The other end of the coil spring 200 is engaged with a holding projection 204 of a spring holding portion 202 formed on the main body 130.

Figure 3:
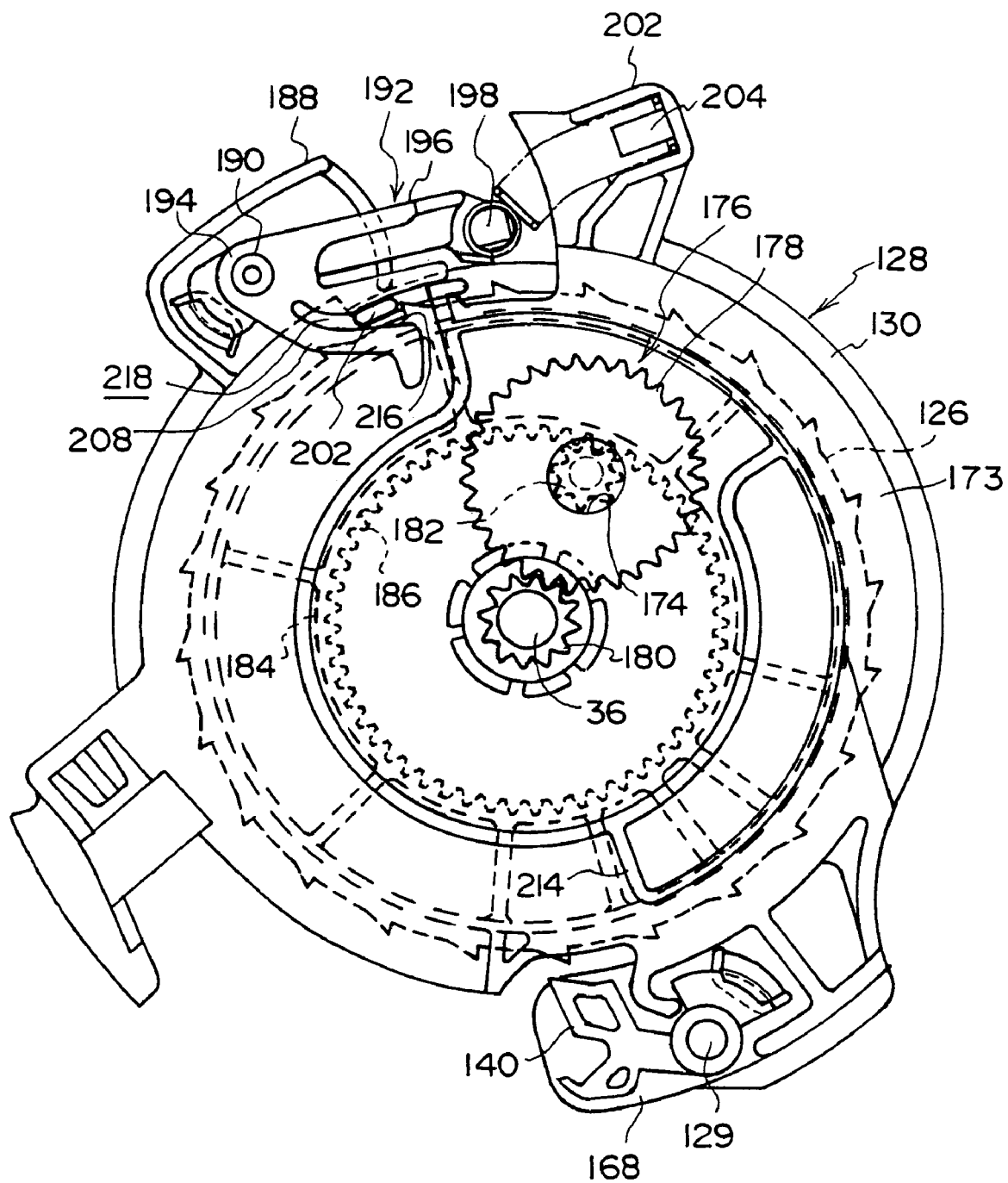
FIG. 3 corresponds to FIG. 2 and shows a condition where the pressing member goes into the inside of a space portion.
Figure 4:
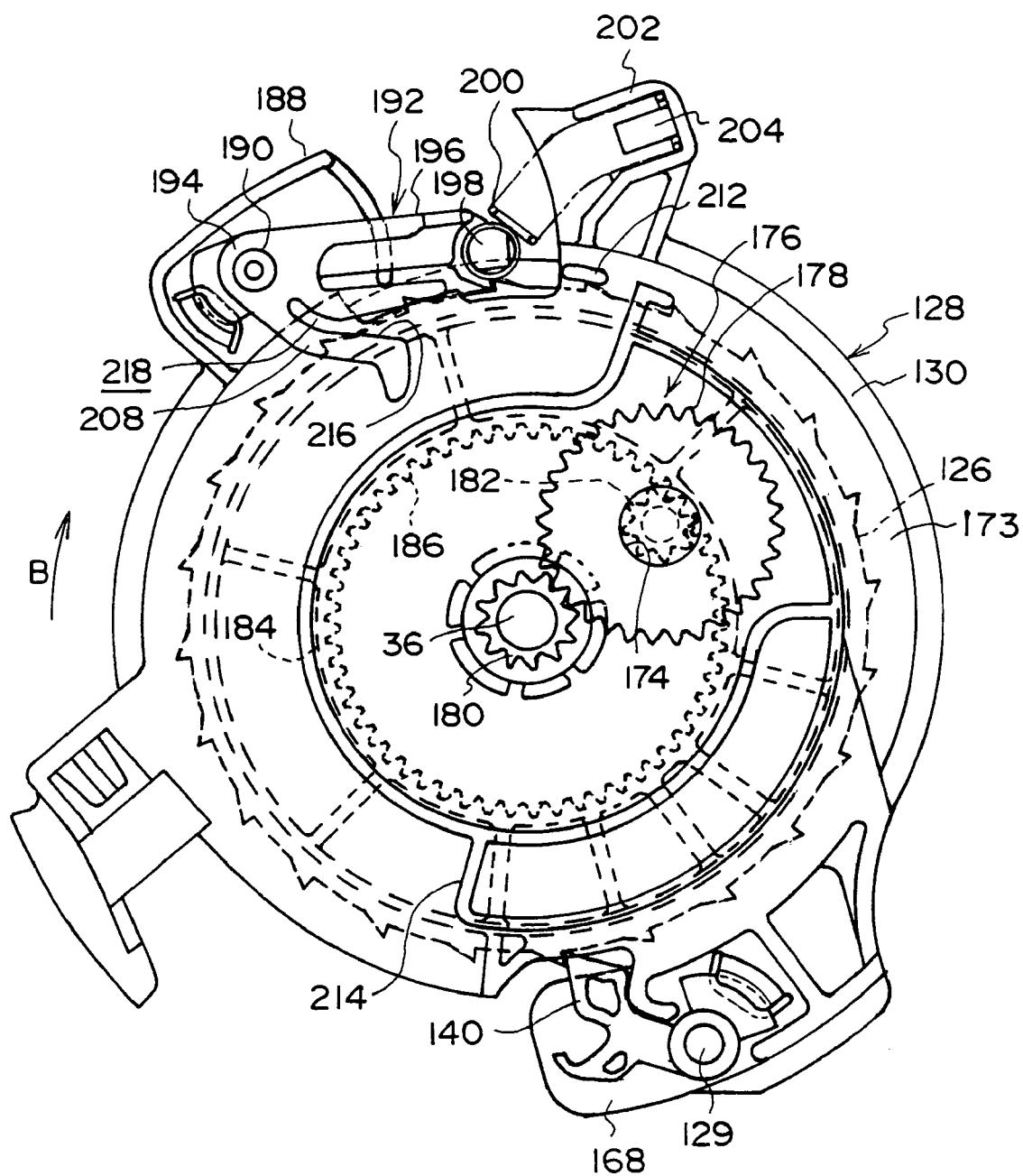
FIG. 4 corresponds to FIG. 2 and shows a condition where the engaging member goes to its engaging position.

In a rotation range of the ALR switch lever 192 around the shaft 190, for example, a rotation position where the holding projection 204 of the spring holding portion 202 is positioned along an extended line of the extending piece 196 from the base 194 is made the neutral position of the ALR switch lever 192 (the position indicated in FIG. 2). With the neutral position as a border, when the extending piece 196 rotates around the shaft 190 in an engaging direction, which is the direction toward the axis of rotation of the sensor gear 128 (as indicated in FIGS. 3 and 4), or in a departure direction opposite to the engaging direction, the coil spring 200 urges the extending piece 196, and accordingly, the ALR switch lever 192 to rotate in the direction of rotation.

Further, from an end of the extending piece 196, a connection pawl 206 is formed at the V gear 126 side. The connection pawl 206 passes between the spring holding portion 202 and the lever housing portion 188 and is positioned at the side of the outer circumferential portion of the V gear 126, and when the extending piece 196 rotates around the shaft 190 toward the axis of rotation (i.e., the torsion shaft 36 side) of the sensor gear 128, the connection pawl 206 engages with the V gear 126.

On the ALR switch lever 192, a lever portion 208 is arranged at an inner side relative to the extending piece 196 with respect to the radius of rotation of the cam plate 173. The lever portion 208 is extended from the base 194 at an opposite side to the sensor gear 128 of the cam plate 173. From the end thereof, a contact portion 210 equivalent to a "projecting portion" is formed to project toward the axis of rotation of the cam plate 173. Corresponding to the contact portion 210 of the lever portion 208, on an opposite surface to the sensor gear 128 side of the cam plate 173, a cam wall 214 and a cam projection 212 equivalent to a "projection" are formed.

The cam projection 212 is formed so as to rotate in the cam pull-out direction (as indicated with the arrow A in FIG. 2) and to be able to contact the contact portion 210 from the front end side of the lever portion 208 as shown in FIG. 2, and when the spool 24, and accordingly the torsion shaft 36, rotate until just before the webbing belt 30 is entirely pulled out from the spool 24, the cam projection 212 contacts the contact portion 210.

The cam wall 214 is formed so as to rotate in the cam take-up direction (as indicated with the arrow B in FIG. 2) and contact the contact portion 210 from the base 194 side of the ALR switch lever 192. When the spool 24, and accordingly the torsion shaft 36 rotate until just before the webbing belt 30 is entirely taken up by the spool 24 with a specified amount of the webbing belt 30 left outside, the cam wall 214 contacts the contact portion 210.

Further, in the lever portion 208, a notched or slot portion 216 that opens at an end portion at a side in the direction of extension is formed and the inside of the notched or slot portion 216 is made as a space portion 218. When the ALR switch lever 192 rotates further to the rotation axis of the cam plate 173 in the condition where the cam projection 212 contacts the contact portion 210, the cam projection 212 can enter into the space portion 218, and when the cam projection 212, and accordingly the cam plate 173 further rotates in the cam pull-out direction in this condition, the cam projection 212 enters inside of the space portion 218 as shown in FIG. 3.

In the present webbing retractor 10, when the webbing belt 30, which is in a state of being taken-up on the spool 24, is pulled toward the distal end side thereof against the urging force of the spiral spring 40, the spool 24 rotates in the pull-out direction while the webbing belt 30 is pulled-out. The webbing belt 30 which is pulled out in this way, is applied around a body of a vehicle occupant. Due to a tongue plate, which is provided at a longitudinal direction intermediate portion of the webbing belt 30 for example, being held by a buckle device provided at a side of the vehicle seat, the webbing belt 30 is applied and restrains the body of the vehicle occupant.

In a state of rapid deceleration of the vehicle, when the hard ball 148 rolls, the sensor claw 150 is pushed upward by the hard ball 148. The sensor claw 150 pushed upward engages with the engaging claw 140 of the sensor gear 128 and rotates the engaging claw 140. By rotating, the engaging claw 140 meshes together with the V gear 126.

When the body of the vehicle occupant inertially moves substantially toward the front of the vehicle in the state of the rapid deceleration of the vehicle, the webbing belt 30 is suddenly pulled out by the body of the vehicle occupant. When the webbing belt 30 is suddenly pulled out in this way, the spool 24, and accordingly the V gear 126 rotates in the pull-out direction rapidly.

When the V gear 126 suddenly rotates in the pull-out direction, the W pawl 134 attempts to rotate in the pull-out direction together with the V gear 126. However, because the W mass 138 is provided at the W pawl 134, the W pawl 134, due to inertia, attempts to remain at that position without rotating. In this way, relative movement against the urging force of the sensor spring 136 arises between the V gear 126, which rotates in the pull-out direction, and the W pawl 134, which is attempting to stop.

Due to the W pawl 134 moving relatively to the V gear 126 in this way, the W pawl 134 engages with the sensor gear 128 resulting in being connected to the V gear 126 via the W pawl 134.

In the state in which the sensor gear 128 is connected to the V gear 126 via the engaging pawl 140 or the W pawl 134 in this way, when the webbing belt 30 is pulled-out by the body of the vehicle occupant and the spool 24 rotates in the pull-out direction, the sensor gear 128 rotates in the pull-out direction together with the V gear 126. When the sensor gear 128 rotates by a given angle in the pull-out direction against the urging force of the return spring 132, the pushing portion 168 which is integral with the engaging claw 140 pushes the pawl portion 166 of the lock pawl 160, and rotates the pawl portion 166 around the shaft 162.

When the pawl portion 166 rotates around the shaft 162, the pawl portion 166 meshes together with the ratchet portion 172 of the lock base 170, and rotation of the lock base 170, and accordingly the spool 24, in the pull-out direction is restricted. In this way, the body of the vehicle occupant, which is attempting to inertially move substantially toward the front of the vehicle, can be reliably restrained and held by the webbing belt 30.

On the other hand, in a case when a child seat is fixed to a seat of a vehicle to which this webbing retractor 10 is loaded, the webbing belt 30 is entirely pulled out at once.

When the webbing belt 30 is pulled out, the spool 24 and the torsion shaft 36 rotate in the pull-out direction and, as a result, the gear 180 rotates in the pull-out direction. The rotation of the gear 180 in the pull-out direction is transmitted via the gear portions 178, 182, and the gear 186 to the cam plate 173 resulting in rotation of the cam plate 173 in the cam pull-out direction (as indicated by the arrow A in FIG. 2).

When the cam plate 173 rotates in the cam pull-out direction, as shown in FIG. 2, the cam projection 212 goes close to the contact portion 210 of the ALR switch lever 192. When the spool 24, and accordingly the torsion shaft 36 reach the rotation position just before the webbing belt 30 is entirely pulled out, the cam projection 212 contacts the contact portion 210.

When the spool 24 rotates further in the pull-out direction in this condition, the cam projection 212 presses the contact portion 210, and the ALR switch lever 192 rotates further to the engaging direction side than the neutral position against the urging force of the coil spring 200.

By the rotation of the ALR switch lever 192, the opening end of the notched portion 216 and the cam projection 212 face each other. When the spool 24 rotates further in the pull-out direction until the webbing belt 30 is entirely pulled out in this condition, the cam projection 212 enters inside of the notched portion 216 to the space portion 218 as shown in FIG. 3.

However, in this condition, the cam projection 212 contacts the inside wall of the notched portion 216 and, therefore, the ALR switch lever 192 does not rotate to the position where the connection pawl 206 engages with the V gear 126.

In a state where the webbing belt 30 is entirely pulled out, the webbing belt 30 is set to the specified portion of the child seat mounted on the seat.

When the tongue plate is engaged with the buckle device to hold the tongue plate, sag of the webbing belt 30 is taken up by the spool 24, and the child seat is held and fixed onto the seat by the webbing belt 30.

When the spool 24 rotates in the take-up direction in order to take up the sag of the webbing belt 30, as shown in FIG. 4, the cam plate 173, and accordingly the cam projection 212, come out from the space portion 218. In this condition, the extending piece 196 rotates to the engaging direction side with respect to the neutral position, and accordingly, the ALR switch lever 192 rotates in the engaging direction by the urging force of the coil spring 200. Thereby, the connection pawl 206 engages with the V gear 126.

Accordingly, when the spool 24 rotates in the pull-out direction in this condition, the sensor gear 128 together with the V gear 126 rotates in the pull-out direction, and as mentioned above, the pressing portion 168 integrated with the engaging pawl 140 presses the pawl portion 166 of the lock pawl 160, and makes the pawl portion 166 rotate around the shaft 162. Thereby, the pawl portion 166 engages with the ratchet portion 172 of the lock base 170, and regulates the rotation of the lock base 170, and accordingly the spool 24, in the pull-out direction.

Because the rotation of the spool 24 in the pull-out direction is regulated, the pull-out operation of the webbing belt 30 is also regulated. Accordingly, the child seat is securely fixed onto the seat as the webbing belt 30 is not slackened.

When the tongue plate is removed from the buckle device and the webbing belt 30 is removed from the child seat, the spool 24 rotates in the take-up direction due to the urging force of the spiral spring 40, and the webbing belt 30 is taken up by the spool 24.

When the spool 24, and accordingly the torsion shaft 36, rotate in the take-up direction, the cam plate 173 rotates in the cam take-up direction (indicated by the arrow B in FIG. 2) resulting in the cam wall 214 going approaching the contact portion 210 from the pull-out direction side. The contact portion 210 is in the state where the ALR switch lever 192 is positioned at the engaging position as shown in FIG. 4.

When the spool 24 reaches the rotation position just before the state where the webbing belt 30 is entirely stored, the cam wall 214 contacts the contact portion 210. Further, when the spool 24 rotates in the take-up direction to the state where the webbing belt 30 is entirely stored, the contact portion 210 is pressed by the cam wall 214.

The ALR switch lever 192 rotates to the departure direction side with respect to the neutral position against the urging force of the coil spring 200. When the ALR switch lever 192 rotates to the departure position, the connection pawl 206 moves away from the V gear 126, and the engagement between the connection pawl 206 and the V gear 126 is released.

Figure 5:
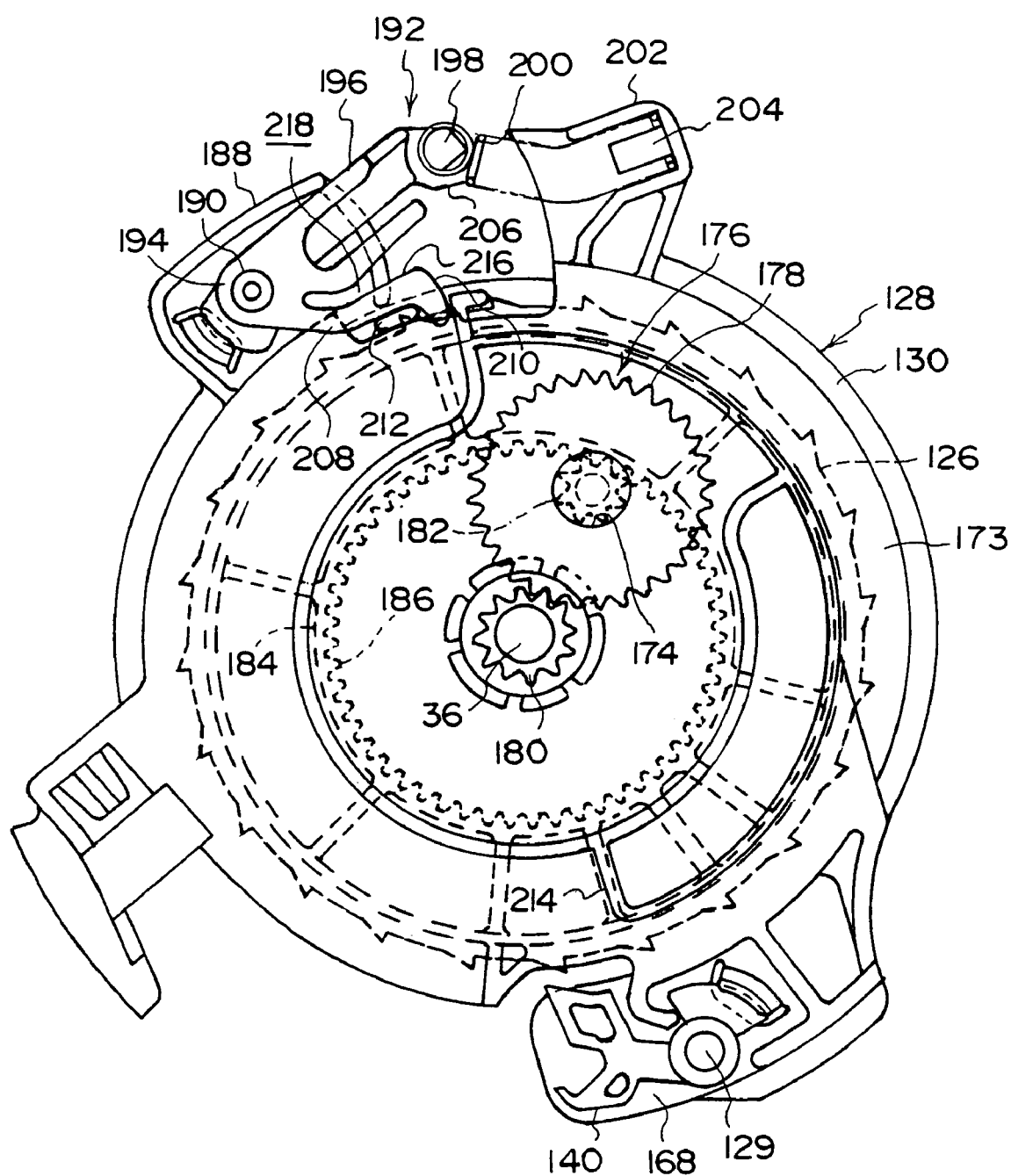
FIG. 5 corresponds to FIG. 2 and shows a condition before assembly.

Meanwhile, as shown in FIG. 5, according to the embodiment of the present invention, when the webbing retractor 10 is assembled in a vehicle, the webbing belt 30 is entirely pulled out. The cam projection 212 is positioned at the cam pull-out direction with respect to the contact portion 210 but without having the cam projection 212 within the space portion 218, differently from the entirely pulled-out condition after assembly as described above.

Even if the cam plate 173 rotates in the cam take-up direction during assembly, the cam projection 212 presses the contact portion 210 and makes the ALR switch lever 192 rotate in the departure direction. Therefore, the connection pawl 206 does not engage with the V gear 126 and the spool 24 can rotate in the pull-out direction, and the webbing belt 30 taken up by the spool 24 can be pulled out at assembly.

Here, as described above, in the entirely pulled-out state of the webbing belt 30 during assembly, the cam projection 212 is positioned further toward the cam pull-out side than the contact portion 210. On the contrary, in the entirely pulled-out state of the webbing belt 30 after assembly, the cam projection 212 approaches and contacts the contact portion 210 and, further, presses the contact portion 210 toward the engaging direction and makes the ALR switch lever 192 rotate. Accordingly, the cam projection 212 does not travel past the contact portion 210 and become positioned at the cam pull-out direction side with respect to the contact portion 210.

However, the ALR switch lever 192 is rotated due to the contact portion 210 being pressed by the cam projection 212 rotating in the cam pull-out direction, and the opening end of the notched portion 216 faces the cam projection 212. The cam projection 212 can rotate further in the direction so as to enter into the space portion 218, i.e., in the cam pull-out direction and, as a result, it can rotate up to the same rotation position as the entirely pulled-out state of the webbing belt 30 during assembly.

Therefore, in this webbing retractor 10, it is possible to eliminate the part of the webbing belt 30 left in the spool 24 in the entirely pulled-out state of the webbing belt 30 even after assembly in a vehicle.

In the webbing retractor 10 according to the aspect of the present preferred embodiment, the ALR switch lever 192, the engaging pawl 140, and the pressing portion 168 are arranged in the sensor gear 128.

In this webbing retractor 10, the sensor gear 128 is used in common as a member for respective mechanisms to regulate the spool rotation, namely, the "ALR mechanism" that regulates the rotation of the spool 24 in the pull-out direction from the entirely pulled-out condition of the webbing belt 30 to the entirely stored condition of the webbing belt 30, the "VSIR mechanism" that regulates the rotation of the spool in the pull-out direction at a vehicle rapid deceleration state detected by the acceleration sensor 142, and the "WSIR mechanism" that regulates the rotation of the spool in the pull-out direction at the moment when the spool 24 rapidly rotates due to a rapid pull-out operation of the webbing belt 30.

Therefore, it is possible to simplify the structures of the above "ALR mechanism", "VSIR mechanism", and "WSIR mechanism" and, accordingly, to simplify the structure of this webbing retractor 10. Thereby, it is possible to make this webbing retractor 10 compact.

What is claimed is:

1. A webbing retractor comprising:
    a spool to which a base end of a long strip-shaped webbing belt is engaged, and that takes up and stores the webbing belt, and rotates when the webbing belt is pulled out to feed the webbing belt out;
    a pressing member having a projection that moves along a circular path in conjunction with the rotation of the spool; and
    an engaging lever that can move in an engaging direction to directly or indirectly engage with the spool and also in the opposite direction thereto; wherein
        the engaging lever is pressed by the pressing member moving in conjunction with the spool, and moves in the engaging direction, when the spool rotates until just before the webbing belt is entirely pulled out, and
        an elongated slot portion forming a grooved longitudinal path in the engaging lever for receiving the pressing member projection along a length of the grooved longitudinal path and opening toward the pressing member side in the moving state of the engaging lever in the engaging direction, the longitudinal axis of the slot being at least partially tangentially oriented with respect to the circular path of the projection; and
    when the spool rotates until the webbing belt is entirely pulled out such that no webbing is wound around the spool, the projection of the pressing member moving in conjunction with the spool enters inside of the slot portion of the engaging lever and slidably engages an edge of said slot portion along the longitudinal axis of said slot portion to move said engaging lever in said engaging direction but in a non-engaging position with respect to the spool, and whenever the spool rotates to re-wind the webbing belt after it has been entirely pulled out, the projection of said pressing member slidably disengages said edge of said slot portion and said engaging lever directly or indirectly engages with the spool.

2. A webbing retractor comprising:

a spool to which a base end of a long strip-shaped webbing belt is engaged, and that takes up and stores the webbing belt, and rotates when the webbing belt is pulled out to feed the webbing belt out;

a pressing member that moves coaxially with the spool in conjunction with the rotation of the spool, and at which a projection is formed to project in parallel with a rotation axis of the spool at an outer side in a rotation radial direction relative to a rotational center of the spool such that the projection moves in a circular path in conjunction with the rotation of the spool; and an engaging lever that can move in a direction toward a rotational center of the pressing member to directly or indirectly engage with the spool; wherein the engaging lever is pressed by the projection moving in conjunction with the spool, and moves in the direction toward the rotational center of the pressing member, when the spool rotates until just before the webbing belt is entirely pulled out, and an elongated slot portion forming a grooved longitudinal path in the engaging lever for receiving the pressing member projection along a length of the grooved longitudinal path and opening toward the projection side in the moving state of the engaging lever toward the rotational center of the pressing member, the longitudinal axis of the slot being at least partially tangentially oriented with respect to the circular path of the projection and when the spool rotates until the webbing belt is entirely pulled out such that no webbing is wound around the spool, the projection moving in conjunction with the spool enters inside of the slot portion of the engaging lever;

wherein an edge of the slot portion defines a cam follower surface that said projection slidably engages along the longitudinal axis of said slot portion to move said engaging lever in said engaging direction but in a non-engaging position with respect to the spool, and wherein every time the spool rotates to re-wind the webbing belt after it has been entirely pulled out, the pressing member slidably disengages said edge of said slot portion and said engaging lever directly or indirectly engages with the spool.

3. A webbing retractor in which a long strip-shaped webbing belt is taken up and stored by a spool to which a base end of the webbing belt is engaged, and when the webbing belt is pulled, the spool rotates in one direction around its own axis and the webbing belt is pulled out, and when the webbing retractor is assembled into a vehicle, the webbing belt is in an initial state where the entire webbing belt is pulled out, comprising:

a pressing member that moves coaxially with the spool along a circular path in conjunction with the rotation of the spool, and at which a projection is formed to project in parallel with a rotation axis of the spool at an outer side in a rotation radial direction relative to a rotational center of the spool; and an engaging lever that can move in a direction toward and away from a rotational center of the pressing member and directly or indirectly engages with the spool when moving toward the rotational center of the pressing member; wherein the engaging lever has a main body and a projecting portion, and the projecting portion is formed to extend toward a rotation trajectory of the projection of the pressing member, and when the projecting portion is pressed by the projection just before the webbing belt is entirely pulled out, the main body moves toward the rotational center of the pressing member, and an elongated slot portion forming a grooved longitudinal path in the engaging lever for receiving the pressing member projection along a length of the grooved longitudinal path and opening toward the projection side in the moving state of the engaging lever toward the rotational center of the pressing member, the longitudinal axis of the slot being at least partially tangentially oriented with respect to the circular path of the projection, and when the spool rotates until the webbing belt is entirely pulled out during a normal operation such that no webbing is wound around the spool, the projection moving in conjunction with the spool enters inside of the slot portion and slidably engages an edge of said slot portion along the longitudinal axis of said slot portion to move said engaging lever in said engaging direction but in a non-engaging position with respect to said spool and stops at a terminal position, and in the initial state, the projection is arranged at the same terminal position with respect to the slot portion as that of the projection in the state where the webbing belt is entirely pulled out such that no webbing belt is wound around the spool when said webbing belt is entirely pulled out, and wherein every time the spool rotates to re-wind the webbing belt after it has been entirely pulled out, the projection slidably disengages said edge of said slot portion and said engaging lever directly or indirectly engages with the spool.

4. A webbing retractor according to any one of claims 1 to claim 3, further comprising:

a rotating body; and a locking member that is arranged so as to be able to directly or indirectly engage with the spool, and regulates the rotation of the spool in a pull-out direction in an engaged state with the spool; wherein the rotating body is arranged so as to be coaxial and rotatable relative to the spool, the rotating body comprises the engaging lever; a rotating engaging member that rotates together with the rotating body in the pull-out direction and makes the locking member engage directly or indirectly with the spool in accordance with the rotation; and a connecting member that, in respective states where the spool rotates rapidly in the pull-out direction and where a vehicle decelerates rapidly, connects the rotating body directly or indirectly to the spool, and makes the rotating body rotate in the pull-out direction together with the spool, and the rotating body rotates together with the spool in the pull-out direction in a state where the engaging lever engages directly or indirectly with the spool.

5. A webbing retractor in which a long strip-shaped webbing belt is taken up and stored by a spool to which a base end of the webbing belt is engaged, and when the webbing belt is pulled, the spool rotates in one direction around its own axis and the webbing belt is pulled out, and when the webbing retractor is assembled into a vehicle, the webbing belt is in an initial state where the entire webbing belt is pulled out such that no webbing is wound around the spool, comprising:

a pressing member having a projection that moves in a circular path in conjunction with the rotation of the spool; and an engaging lever having a side edge facing said spool, said engaging lever being movable in an engaging direction to directly or indirectly engage the spool and also in the opposite direction to the engaging direction, and in which an elongated slot portion to slidably receive and house the projection of the pressing member is formed, the longitudinal axis of the slot being tangentially oriented with respect to the circular path of the projection; and a pivotal connection means for pivotally positioning said pressing member such that said projection engages said bottom edge of said engaging lever during assembly in said initial state where the entire webbing belt is pulled out, wherein in a state where the webbing belt is entirely pulled out from the spool, the projection of the pressing member is housed in the slot portion at a terminal position such that no webbing belt is wound around the spool when said webbing belt is entirely pulled out, and wherein every time the spool rotates to re-wind the webbing belt after it has been entirely pulled out, the projection slidably disengages said edge of said slot portion and said engaging lever directly or indirectly engages with the spool.

6. A webbing retractor comprising:

a spool to which a base end of a long strip-shaped webbing belt is engaged, and that takes up the webbing belt;

a pressing member having a projection that moves in a circular path in conjunction with the rotation of the spool, a rotating body that is coaxial and rotatable relative to the spool;

a locking member that engages with the spool and regulates the rotation of the spool in a pull-out direction of the webbing belt;

an engaging lever, which is arranged in the rotating body, and can move in an engaging direction to engage directly or indirectly with the spool and also in the opposite direction to the engaging direction, wherein an elongated slot portion to receive and house the projection of the pressing member is formed, the longitudinal axis of the slot being tangentially oriented with respect to the circular path of the projection, and wherein in a state where the webbing belt is entirely pulled out from the spool, the projection of the pressing member is received and housed in the slot portion and slidably engages an edge of said slot portion along the longitudinal axis of said slot portion to move said engaging lever in said engaging direction but into a non-engaging position with respect to the spool and stops at a terminal position;

a rotation engaging member that is arranged in the rotating body, and rotates together with the rotating body in the pull-out direction of the webbing belt, and makes the locking member engage with the spool in accordance with the rotation; and a connecting member that is arranged in the rotating body, and connects the rotating body with the spool, and makes the rotating body rotate in the pull-out direction together with the spool, wherein every time the spool rotates to re-wind the webbing belt after it has been entirely pulled out, the projection slidably disengages said edge of said slot portion and said engaging lever directly or indirectly engages with the spool.

7. A webbing retractor according to claim 5 or claim 6, wherein said projection is formed at the pressing member so as to project at an outer side in a rotation radial direction relative to a rotational center of the pressing member.

8. A webbing retractor according to claim 7, wherein the engaging lever has a main body and a projecting portion, and the projecting portion is formed to extend toward a rotation trajectory of the projection of the pressing member when the projection moves in conjunction with the rotation of the spool, and the slot portion is formed between the main body and the projecting portion.

9. A webbing retractor according to claim 8, wherein in accordance with the pulling-out of the webbing belt from the spool, the projection of the pressing member presses the projecting portion of the engaging lever, and in the state where the webbing belt is entirely pulled out from the spool, the projection is housed in the slot portion of the engaging lever.

10. A webbing retractor comprising:

a spool to which a base end of a long strip-shaped webbing belt is engaged, and that takes up and stores the webbing belt, and rotates when the webbing belt is pulled out to feed the webbing belt out;

a pressing member that moves coaxially with the spool in conjunction with the rotation of the spool, and at which a projection is formed to project in parallel with a rotation axis of the spool at an outer side in a rotation radial direction relative to a rotational center of the spool; and an engaging lever that can move in a direction toward a rotational center of the pressing member to directly or indirectly engage with the spool; wherein the engaging lever is pressed by the projection moving in conjunction with the spool, and moves in the direction toward the rotational center of the pressing member, when the spool rotates until just before the webbing belt is entirely pulled out, and a slot portion is formed in the engaging lever so as to open toward the projection side in the moving state of the engaging lever toward the rotational center of the pressing member, a width of the slot portion being no more than about twice the width of the projection, and when the spool rotates until the webbing belt is almost entirely pulled out, the projection moving in conjunction with the spool enters an open end of the slot portion of the engaging lever;

wherein an edge of the slot portion defines a cam follower surface that said projection slidably engages along the longitudinal axis of said slot portion to move said engaging lever in said engaging direction but into a non-engaging position with respect to the spool, and wherein in a state where the webbing belt is entirely pulled out from the spool, the projection of the pressing member is housed in the slot portion at a terminal position such that no belt webbing is wound around the spool when said webbing belt is entirely pulled out, and wherein every time the spool rotates to re-wind the webbing belt after it has been entirely pulled out, the projection slidably disengages said edge of said slot portion and said engaging lever directly or indirectly engages with the spool.

* * * * *